(12) United States Patent
Kojima et al.

(10) Patent No.: US 7,451,597 B2
(45) Date of Patent: Nov. 18, 2008

(54) INTAKE SYSTEM OF INTERNAL COMBUSTION ENGINE

(75) Inventors: Ichiyo Kojima, Anjo (JP); Toshio Inui, Mukou (JP); Hideo Nakai, Kusatsu (JP); Tetsuo Kataoka, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 476 days.

(21) Appl. No.: 11/236,540

(22) Filed: Sep. 28, 2005

(65) Prior Publication Data

US 2006/0064981 A1 Mar. 30, 2006

(30) Foreign Application Priority Data

Sep. 29, 2004 (JP) ............... 2004-285472

(51) Int. Cl.
*F02B 33/44* (2006.01)
(52) U.S. Cl. ................. 60/605.1; 60/605.2; 60/611; 60/612
(58) Field of Classification Search ............ 60/605.1, 60/605.2, 611, 612
See application file for complete search history.

(56) References Cited

U.S. PATENT DOCUMENTS

| | | | | |
|---|---|---|---|---|
| 3,914,944 A | * | 10/1975 | Schmidt et al. | 60/605.1 |
| 4,457,134 A | * | 7/1984 | Deutschmann | 60/612 |
| 4,903,489 A | * | 2/1990 | Ruetz | 60/612 |
| 5,199,261 A | * | 4/1993 | Baker | 60/612 |
| 5,927,075 A | * | 7/1999 | Khair | 60/605.2 |
| 6,062,026 A | * | 5/2000 | Woollenweber et al. | 60/605.2 |
| 6,327,856 B1 | * | 12/2001 | Iwabuchi et al. | 60/603 |
| 2002/0083700 A1 | * | 7/2002 | Ellmer et al. | 60/278 |

FOREIGN PATENT DOCUMENTS

| | | |
|---|---|---|
| DE | 100 62 377 A1 | 6/2002 |
| JP | 2003-286832 A | 10/2003 |
| JP | 2004-76659 A | 3/2004 |

* cited by examiner

*Primary Examiner*—Hoang M Nguyen
(74) *Attorney, Agent, or Firm*—Birch, Stewart, Kolasch & Birch, LLP

(57) ABSTRACT

An engine includes an electric supercharger as a first supercharger, a turbocharger as a second supercharger, a secondary air supply passage, a secondary air valve and a catalyst. The electric supercharger is provided in an intake passage which is in communication with a combustion chamber, and supercharges intake air into the combustion chamber. The turbocharger is provided in the intake passage in series with respect to the electric supercharger, and supercharges intake air to the combustion chamber. The secondary air supply passage and the secondary air valve supply air compressed by the electric supercharger to a discharge passage which is in communication with the combustion chamber. The catalyst is provided in the discharge passage to purify exhaust gas.

6 Claims, 2 Drawing Sheets

INTAKE SYSTEM OF INTERNAL COMBUSTION ENGINE

BACKGROUND OF THE INVENTION

1. Field of the Invention

The present invention relates to an internal combustion engine having two superchargers.

2. Description of the Related Art

To enhance the charging ratio of air, there is an engine having a turbocharger. The turbocharger includes a turbine and a compressor. The turbine is provided in a discharge passage. The compressor is provided in an intake passage. The compressor is driven in association with the turbine, and supercharges intake air into a combustion chamber.

In an engine of this kind, the turbine is rotated by exhaust gas flowing through the discharge passage. The compressor is driven in association with the turbine, and the intake air is supercharged into the combustion chamber. With this, the charging ratio of air is enhanced.

However, when the number of revolutions of the engine is in a predetermined rotation range, for example in a high rotation range, the turbocharger is set such that the air is supercharged. Thus, when the number of revolutions of the engine is out of the effective rotation range, no effect can be obtained.

To solve the inconvenience of the turbocharger and to enhance the charging ratio even when the number of revolutions of the engine is out of the effective rotation range, there is proposed an engine having a turbocharger and an electric supercharger. Jpn. Pat. Appln. KOKAI Publication No. 2004-76659 discloses such an engine.

The electric supercharger includes a compressor and an electric motor. The compressor is provided in an intake passage. The electric motor drives the compressor. Thus, the electric supercharger can supercharge the intake air into the combustion chamber irrespective of the number of revolutions of the engine.

According to the engine of this kind, when the number of revolutions of the engine is low, the charging ratio of air is enhanced by the electric supercharger. In the engine of this kind, when the number of revolutions of the engine is high, the charging ratio of air is enhanced by the turbocharger.

To clean the exhaust gas, there is an engine having a catalyst in the discharge passage. When the catalyst is heated to active temperature by the exhaust gas, the catalyst cleans the exhaust gas.

However, at the time of start of the engine, the catalyst is not heated yet. Thus, the exhaust gas is not cleaned and discharged out until the temperature of the catalyst reaches the active temperature.

Especially like the engine disclosed in Jpn. Pat. Appln. KOKAI Publication No. 2004-76659, if the turbine of the turbocharger is provided in the discharge passage, the exhaust gas must also heat the turbine. That is, the heat capacity of the exhaust system is increased. Thus, the time elapsed until the temperature of the catalyst reaches the active temperature is increased. Therefore, it is conceived that most of the exhaust gas is not cleaned and discharged out.

Thus, there is proposed a secondary air supply system for heating the exhaust system. The secondary air supply system supplies secondary air to the discharge passage. Unburned fuel in the exhaust gas is burned in the discharge passage by the secondary air supplied to the discharge passage. As a result, the exhaust system is heated.

The secondary air supply system of this kind is separately provided with a compressor for supplying compressed air into the discharge passage. However, if the compressor is separately prepared, the cost is increased.

Hence, it is an object of the present invention to provide an internal combustion engine having a supercharger capable of effectively cleaning exhaust gas while restraining the cost.

SUMMARY OF THE INVENTION

An internal combustion engine having a supercharger according to a first aspect of the present invention comprises a first supercharger, a second supercharger, secondary air supply means and a catalyst. The first supercharger is provided in an intake passage which is in communication with a combustion chamber and supercharges intake air into the combustion chamber. The second supercharger is provided in the intake passage and supercharges the intake air into the combustion chamber. The first supercharger and the second supercharger are disposed in series, in the intake passage. The secondary air supply means supplies secondary air compressed by the first supercharger to a discharge passage which is in communication with the combustion chamber The catalyst is provided in the discharge passage and purifies exhaust gas.

In the internal combustion engine having the supercharger of such a structure, the secondary air which is sufficiently compressed by the first supercharger is supplied to the discharge passage when the secondary air is supplied to the discharge passage because the temperature of the catalyst is low, for example, as the internal combustion engine is started at a cold temperature.

That is, even when the internal combustion engine is staffed at the cold temperature, if the secondary air is compressed using the first supercharger, sufficient combustion is obtained in the discharge passage, and the catalyst is heated to the active temperature at an early stage. When the secondary air is supplied to the discharge passage, it is unnecessary to separately prepare a compressor for compressing the secondary air. The first supercharger and the second supercharger arc disposed in series. So, it is unnecessary to arrange passages for the first supercharger and the second supercharger in parallel. Thereby the structure of the engine is not complicated.

An internal combustion engine having a supercharger according to a second aspect of the present invention comprises an internal combustion engine body, an intake passage, a discharge passage, an electric supercharger, a turbocharger, a secondary air supply passage, a secondary air valve, a catalyst and a controller. The internal combustion engine body comprises a combustion chamber. The intake passage is in communication with the combustion chamber. The discharge passage is in communication with the combustion chamber. The electric supercharger comprises a driving electric motor and is provided in the intake passage, and supercharges the intake air to the combustion chamber. The turbocharger is provided in the intake passage at the downstream of the electric supercharger and is driven by exhaust gas. The secondary air supply passage is branched off from a secondary air supply passage branch portion between the electric supercharger and the turbocharger in the intake passage, and merges with the discharge passage. The secondary air valve is provided in the secondary air supply passage and opens and closes the secondary air supply passage. The catalyst is provided in the discharge passage and purifies exhaust gas. The controller which controls an opening and closing operation of the secondary air valve and a driving operation of the electric supercharger based on a driving state of the internal combustion engine body. The controller opens the secondary air valve and drives the electric supercharger when secondary air is supplied to the discharge passage.

In such an internal combustion engine having the supercharger, when the secondary air is supplied to the discharge passage, the control apparatus opens the secondary air valve and drives the electric supercharger. Thus, the secondary air compressed by the electric supercharger is supplied to the discharge passage through the secondary air supply passage when the secondary air is supplied to the discharge passage because the temperature of the catalyst is low for example, as the internal combustion engine is started at the cold temperature. The unburned fuel in the exhaust gas is burned by the supplied secondary air.

With this, even when the internal combustion engine is started at the cold temperature, the secondary air is compressed using the electric supercharger and sufficient combustion is obtained in the discharge passage, and the catalyst is heated to the active temperature at an early stage. Further, since the electric supercharger is used, it is unnecessary to separately prepare the compressor for compressing the secondary air.

Additional objects and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

An internal combustion engine having a supercharger according to a first embodiment of the present invention will be explained with reference to FIG. 1 based on an engine 10 for an automobile as a example. The engine 10 is a water-cooled reciprocating engine for example.

Figure 1:
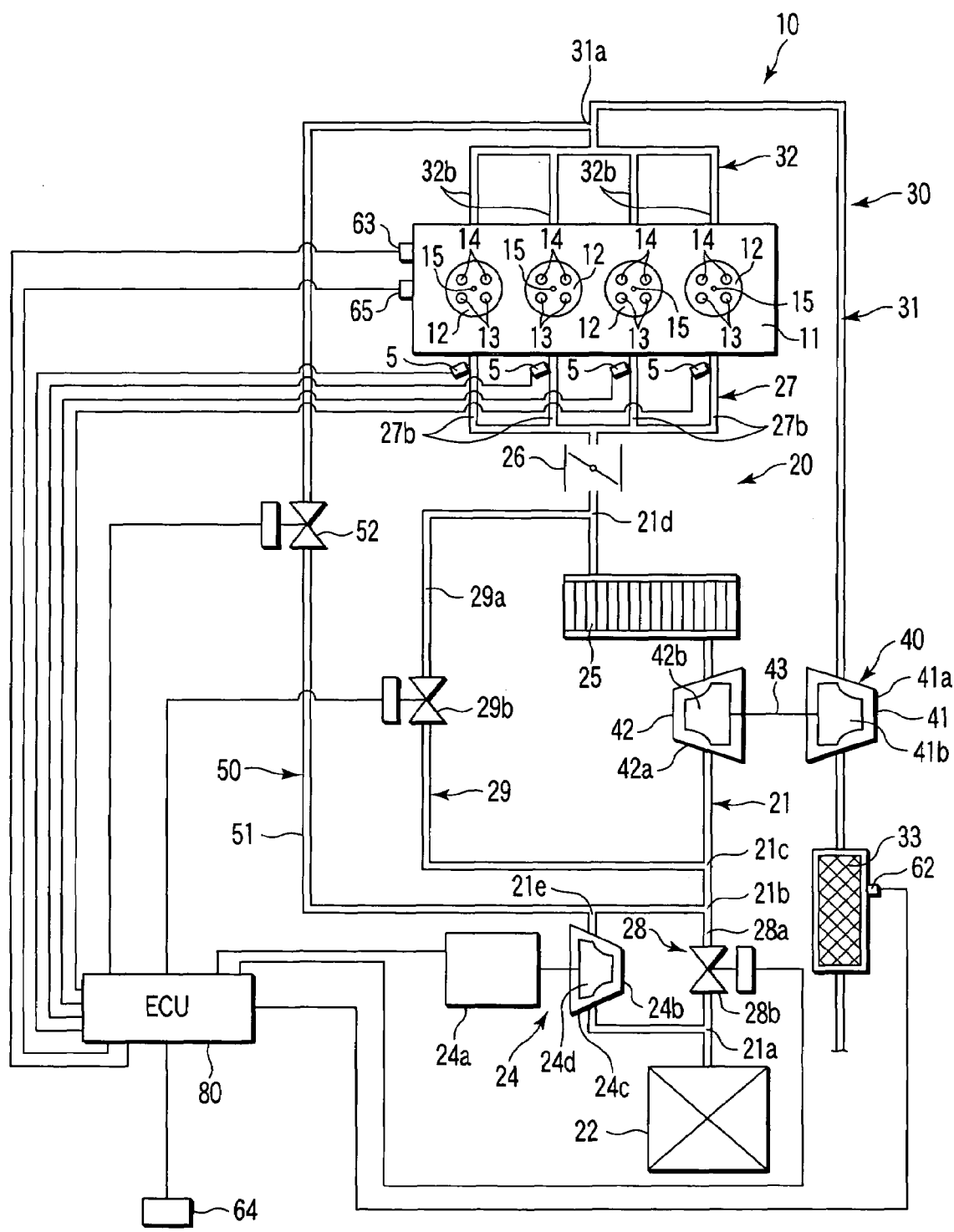
FIG. 1 is a schematic diagram of an engine according to a first embodiment of the present invention.

FIG. 1 schematically shows the engine 10. As shown in FIG. 1, the engine 10 includes an engine body 11, an intake system 20, an exhaust system 30, an electric supercharger 24 as a first supercharger, a turbocharger 40 as a second supercharger, secondary air supply means 50, driving state detection means, and an ECU 80.

The engine body 11 includes a plurality of combustion chambers 12. Disposed in each combustion chamber 12 are a pair of intake valves 13, a pair of exhaust valves 14 and an ignition plug 15, for example.

The intake system 20 includes an intake passage 21, an electric supercharger bypass portion 28 and a turbocharger bypass portion 29. The intake passage 21 is a passage through which air flows into each of the combustion chambers 12 from outside. The intake passage 21 includes an air cleaner 22, an electric supercharger 24, an intercooler 25, a throttle valve 26 and an intake manifold 27.

The air cleaner 22 is provided at the upstream end of the intake passage 21. The electric supercharger 24 includes an electric motor 24a and a first compressor 24b. The first compressor 24b is driven by the electric motor 24a. The first compressor 24b includes a housing 24c, a first compressor wheel 24d and the like. The first compressor wheel 24d is accommodated in the housing 24c. The first compressor 24b is disposed at the downstream of the air cleaner 22.

The electric supercharger 24 is driven by the electric motor 24a. Thus, the electric supercharger 24 can supercharge intake air into the combustion chamber 12 irrespective of the driving state of the engine 10.

The electric supercharger 24 has a low capacity. The electric supercharger 24 is designed such that the electric supercharger 24 can effectively supercharge air into the combustion chamber 12 when the number of revolutions of the engine body 11 is in the range of low to middle levels. That is, the electric supercharger 24 can supercharge the intake air into each combustion chamber 12 even if the number of revolutions of the engine 10 is low such as when the engine 10 is just started.

Thus, the electric supercharger 24 need not be a large supercharger. In short, it is only necessary that the electric supercharger 24 has a capacity and a function capable of enhancing the charging ratio even when the number of revolutions of the engine 10 is in the range of low to middle levels. Therefore, if the first supercharger has a low capacity, the driving load of the first supercharger can be reduced, and the first supercharger can be compact in size.

The intercooler 25 is disposed at the downstream of the first compressor 24b. The throttle valve 26 is disposed at the downstream of the intercooler 25. The throttle valve 26 is operated by an accelerator pedal (not shown) and opens and closes the intake passage 21.

The intake manifold 27 is disposed at the downstream of the intake passage 21. The intake manifold 27 has a plurality of branch pipes 27b, the number of which corresponds to the number of combustion chambers 12. Each branch pipe 27b is in communication with an intake port of the engine body 11. The intake port is formed in the engine body 11 in correspondence with each combustion chamber 12. An injector 5 as fuel supply means is disposed in the vicinity of each intake port.

As described above, the intake passage 21 introduces air into each combustion chamber 12 through the air cleaner 22, the first compressor 24b, the intercooler 25, the throttle valve 26 and the intake manifold 27 in this order.

The exhaust system 30 includes a discharge passage 31. The discharge passage 31 includes an exhaust manifold 32 and a catalyst 33. The exhaust manifold 32 includes a plurality of branch pipes 32b, the number of which corresponds to the number of combustion chambers 12. Each branch pipe 32b is in communication with an exhaust port of the engine body 11. The exhaust port is formed in the engine body 11 in correspondence with each combustion chamber 12. The catalyst 33 is disposed at the downstream of the exhaust manifold 32. The catalyst 33 purifies harmful material such as NOx and unburned fuel in the exhaust gas.

A catalyst temperature sensor 62 as temperature detection means is disposed in the vicinity of the catalyst 33. The catalyst temperature sensor 62 detects the temperature of the catalyst 33. The discharge passage 31 introduces the exhaust gas to outside through the exhaust manifold 32 and the catalyst 33 in this order as described above.

The turbocharger 40 includes a turbine 41 and a second compressor 42. The turbine 41 is arranged in the discharge passage 31, for example, at the upstream of the catalyst 33 and at the downstream of the exhaust manifold 32. The turbine 41 includes a housing 41a and a turbine wheel 41b. The turbine wheel 41b is accommodated in the housing 41a. The turbine wheel 41b is rotated by energy of the exhaust gas.

The second compressor 42 includes a housing 42a and a second compressor wheel 42b. The second compressor wheel 42b is accommodated in the housing 42a. The second compressor 42 is disposed in the intake passage 21 between the first compressor 24b and the intercooler 25. The second compressor wheel 42b is disposed coaxial with the turbine wheel 41b by the shaft 43. The second compressor wheel 42b and the turbine wheel 41b are connected to each other through a shaft 43. Thus, the second compressor wheel 42b and the turbine wheel 41b rotate in unison with each other.

The turbocharger 40 has a high capacity, and effectively supercharges air when the number of revolutions of the engine 10 is high.

The secondary air supply means 50 includes a secondary air supply passage 51 and a secondary air valve 52. The secondary air supply passage 51 comprises a pipe member for example. The secondary air supply passage 51 is in communication with the intake passage 21 and the discharge passage 31.

More specifically, the secondary air supply passage 51 is branched off from a secondary air supply passage branch portion 21e between the first compressor 24b and the second compressor 42 in the intake passage 21. The secondary air supply passage 51 is in communication with a secondary air supply passage merging portion 31a downstream of the exhaust manifold 32 and upstream of the turbine 41 in the discharge passage 31.

The secondary air valve 52 is a solenoid valve for example, and is disposed in the secondary air supply passage 51. The secondary air valve 52 opens and closes the secondary air supply passage 51.

The intake system 20 will be explained again. The turbocharger bypass portion 29 includes a turbocharger bypass passage 29a and a turbocharger bypass valve 29b. For example a pipe member or some pipe members constitute the turbocharger bypass passage 29a. The turbocharger bypass passage 29a bypasses the second compressor 42.

More specifically, the turbocharger bypass passage 29a is branched off from a first branch portion 21c between the secondary air supply passage branch portion 21e and the second compressor 42 in the intake passage 21. The turbocharger bypass passage 29a merges with a first merging portion 21d between the throttle valve 26 and the intercooler 25 in the intake passage 21. Thus, the turbocharger bypass passage 29a bypasses the second compressor 42.

The turbocharger bypass valve 29b is a solenoid valve for example, and is provided in the turbocharger bypass passage 29a. The turbocharger bypass valve 29b opens and closes the turbocharger bypass passage 29a.

The electric supercharger bypass portion 28 includes an electric supercharger bypass passage 28a and an electric supercharger bypass valve 28b. For example A pipe member or some pipe members constitute the electric supercharger bypass passage 28a. The electric supercharger bypass passage 28a bypasses the first compressor 24b.

More specifically, the electric supercharger bypass passage 28a is branched off from a second branch portion 21a between the air cleaner 22 and the first compressor 24b in the intake passage 21. The electric supercharger bypass passage 28a merges with a second merging portion 21b between the secondary air supply passage branch portion 21e and the first branch portion 21c in the intake passage 21. Thus, the electric supercharger bypass passage 28a bypasses the first compressor 24b.

The electric supercharger bypass valve 28b is a solenoid valve for example, and is provided in the electric supercharger bypass passage 28a. The electric supercharger bypass valve 28b opens and closes the electric supercharger bypass passage 28a.

The driving state detection means includes the catalyst temperature sensor 62, a cooling water temperature sensor 63, an acceleration pedal opening sensor 64, and a number of revolution sensor 65.

The catalyst temperature sensor 62 is provided in the vicinity of the catalyst 33. The catalyst temperature sensor 62 detects the temperature of the catalyst 33. The cooling water temperature sensor 63 is provided in the engine body 11. The cooling water temperature sensor 63 detects the temperature of cooling water. The acceleration pedal opening sensor 64 detects the depressing amount of the acceleration pedal. The number of revolution sensor 65 is provided in the engine body 11. The number of revolution sensor 65 detects the number of revolutions of a crankshaft (not shown) of the engine body 11.

The ECU 80 is electrically connected to the catalyst temperature sensor 62, the cooling water temperature sensor 63, the acceleration pedal opening sensor 64 and the number of revolution sensor 65. The ECU 80 detects the driving state of the engine body 11 based on information sent from each sensor.

The ECU 80 is also electrically connected to the electric motor 24a, the injector 5, the turbocharger bypass valve 29b, the electric supercharger bypass valve 28b, and the secondary air valve 52.

The ECU 80 controls the electric motor 24a in accordance with the driving state of the engine body 11. The ECU 80 adjusts the amount of fuel injected from each injector 5 depending on the driving state of the engine 10. The ECU 80 controls the opening and closing operation of the turbocharger bypass valve 29b, the opening and closing operation of the electric supercharger bypass valve 28b and the opening and closing operation of the secondary air valve 52 depending on the driving state of the engine 10.

Next, the operation of the engine 10 will be explained.

If a driver rides on the vehicle and starts the engine 10, the engine 10 is brought into an idling driving state. If the ECU 80 determines that the engine 10 is cold from information from the cooling water temperature sensor 63 and the catalyst temperature sensor 62, the ECU 80 closes the electric supercharger bypass valve 28b and opens the turbocharger bypass valve 29b and the secondary air valve 52.

With this, the electric supercharger bypass passage 28a is cut off. Further, the ECU 80 drives the electric supercharger 24 and increases the amount of fuel to be injected from each injector 5.

Air which has passed through the air cleaner 22 reaches the first compressor 24b. The air inhaled into the first compressor 24b is compressed. A portion of the compressed air passes through the turbocharger bypass passage 29a and is supercharged into each combustion chamber 12.

This is because the second compressor 42 acts as resistance to the air flow when the number of revolutions of the engine 10 is low since the exhausting pressure of the exhaust gas is not sufficient.

In other words, if the turbocharger bypass valve 29b is opened, a portion of the compressed air does not pass through the second compressor 42 but passes through the turbocharger bypass passage 29a and is supercharged into each combustion chamber 12. With this, reduction in intake pressure generated when the compressed air which is supercharged into the combustion chamber 12 passes through the second compressor 42 is suppressed.

The turbocharger bypass portion 29 and the ECU 80 restrain the air compressed by the electric supercharger 24 from entering the second compressor 42. That is, the turbocharger bypass portion 29 and the ECU 80 constitute an example of restraining means of the present invention.

Fuel supplied to each combustion chamber 12 is increased by the control of the ECU 80. Thus, the amount of unburned fuel included in the exhaust gas is increased. A portion of air compressed by the first compressor 24b passes through the secondary air supply passage 51 and is supplied to the discharge passage 31.

With this, the unburned fuel is burned in the discharge passage 31 by the supplied compressed air. With this combustion heat, the discharge passage 31 is heated at an early stage. That is, the catalyst 33 is heated to the active temperature at an early stage.

After a while from the start of the engine 10, the catalyst 33 is heated to the active temperature. If the catalyst 33 is heated to the active temperature, harmful materials such as unburned fuel and NOx in the exhaust gas are purified by the catalyst 33.

If the catalyst 33 is heated to the active temperature, it becomes unnecessary to supply the secondary air to the discharge passage 31 through the electric supercharger 24. Thus, if the catalyst temperature sensor 62 detects that the catalyst 33 is heated to the active temperature, the ECU 80 closes the secondary air valve 52 and stops the operation of the electric supercharger 24. With this, the supply of compressed air into the discharge passage 31 is stopped.

Further, the ECU 80 opens the electric supercharger bypass valve 28b. That is, in this state, the turbocharger bypass valve 29b and the electric supercharger bypass valve 28b are opened, and the secondary air valve 52 is closed. The air which has passed through the air cleaner 22 passes through the electric supercharger bypass passage 28a.

This is because the stopped first compressor 24b acts as resistance to the air flow. The air which has passed through the electric supercharger bypass passage 28a merges with the intake passage 21 and then, the air is supplied into each combustion chamber 12 through the turbocharger bypass passage 29a.

The air bypasses the first and second compressors 24b and 42 and the intercooler 25 in this manner. Thus, since the supply of air into the first and second compressors 24b and 42 and the intercoller 25 is suppressed, the intake capacity is reduced, and the intake pressure loss is suppressed. The intake capacity is a capacity of air flow in the intake system 20.

Next, the driver starts the automobile after preparation for the start. In this state, the number of revolutions of the engine 10 is low. The driver depresses the acceleration pedal and accelerates the automobile.

When accelerating the automobile from low or middle speed to a predetermined speed for a short time, that is, if the ECU 80 detects that the number of revolutions of the engine 10 is at middle level and the load is at the middle level from the information of the number of revolution sensor 65 and the acceleration pedal opening sensor 64, the ECU 80 closes the electric supercharger bypass valve 28b and the secondary air valve 52, opens the turbocharger bypass valve 29b and drives the electric supercharger 24.

With this, air which has passed the air cleaner 22 does not pass through the electric supercharger bypass passage 28a and reaches the first compressor 24b. The air inhaled into the first compressor 24b is supercharged into each combustion chamber 12 mainly through the turbocharger bypass passage 29a.

This is because the second compressor 42 acts as resistance to the air flow. More specifically, when the number of revolutions of the engine 10 is at the middle level, the turbine wheel 41b of the turbine 41 is not rotated effectively. For this reason, the exhaust gas pressure is not sufficiently increased for a predetermined time after the acceleration pedal is depressed and thus, the turbine wheel 41b does not rotate so much.

Thus, the second compressor wheel 42b acts as the resistance to the air flow for the predetermined time after the acceleration pedal is depressed, and the compressed air is restrained from entering the second compressor 42 and the intake resistance is reduced.

Since the driving state of the electric supercharger 24 does not depend on the number of revolutions of the engine 10, it is possible to sufficiently supercharge air into the combustion chamber 12 with respect to the depression of the acceleration pedal. The automobile is thereby accelerated in great response to the depressing of the acceleration pedal even until the exhaust gas pressure reaches an effective value for the turbocharger 40.

The automobile may go uphill for a long time. In this case, the rotation speed of the engine body 11 is low or middle and load on the body 11 is large. The ECU 80 detects this from the information supplied from the acceleration-pedal opening sensor 64 and rotation speed sensor 65. The ECU 80 generates a signal, which closes the turbocharger bypass valve 29b, electric supercharger bypass valve 28b and secondary air valve 52 and drives the electric supercharger 24.

With this, when the second compressor 42 acts as resistance or until the exhaust gas pressure becomes an effective value for the turbocharger 40, the turbocharger bypass valve 29b is opened. The air which is compressed by the electric supercharger 24 mainly pass through the turbocharger bypass passage 29a and which is supercharged into each combustion chamber 12.

Thereafter, if the turbine wheel 41b is effectively rotated by the supercharge, since the second compressor 42 does not act as the resistance to the flow, the turbocharger bypass passage 29a is cut off, the air compressed by the electric supercharger 24 is inhaled into the second compressor 42 and is again compressed and then, is supercharged into each combustion chamber 12.

With this, when the number of revolutions of the engine body 11 is in a range of low to middle levels and the load is high, air is compressed in two stages by the electric supercharger 24 and the turbocharger 40, and is supercharged into each combustion chamber 12. Thus, the engine 10 can obtain high output.

If the ECU 80 detects that the automobile runs on an expressway or that the number of revolutions of the engine body 11 is high and the load is high from the information of the acceleration pedal opening sensor 64 and the number of revolution sensor 65, the ECU 80 opens the electric supercharger bypass valve 28b, closes the turbocharger bypass valve 29b and the secondary air valve 52, and stops the electric supercharger 24.

This is because the electric supercharger 24 is set such that it is effectively operated when the number of revolutions of the engine 10 is in the range of low to middle levels, and the electric supercharger 24 acts as resistance to the air flow when the number of revolutions of the engine 10 is high.

With this, the air which has passed through the air cleaner 22 bypasses the first compressor 24b and reaches the second compressor 42, and is supercharged into each combustion chamber 12 by the second compressor 42. Thus, the engine can obtain higher output even when the number of revolutions of the engine is high and the load is high.

According to the engine 10 having such a structure, when the engine 10 is started, the secondary air is compressed by the electric supercharger 24, and is supplied into the discharge passage 31 through the secondary air supply passage 51.

That is, the electric supercharger 24 as a supercharger for low and middle revolution of the engine 10 is used as a compressor for supplying secondary air. With this, when the engine 10 is started, even if the number of revolutions of the engine body 11 is low, the catalyst 33 is heated to the active temperature at an early stage. With this, even when the engine 10 is started, the exhaust gas is purified at an early stage. That is, harmful material in the exhaust gas is restrained from flowing outside.

Since it is unnecessary to separately dispose a compressor for supplying secondary air, the increase in cost is suppressed. As compared with a case in which the electric supercharger 24 is increased in size and the turbocharger 40 is not used, the cost of the electric supercharger 24 is reduced, and the electricity consumption of the electric supercharger 24 can also be reduced. Therefore, the cost of the engine 10 can be suppressed. That is, the engine 10 can effectively purify the exhaust gas while suppressing the cost.

The electric supercharger 24 and the turbocharger 40 are disposed in series. More specifically, the first compressor 24b of the electric supercharger 24 and the second compressor 42 of the turbocharger 40 are disposed in series. Thus, it is unnecessary to arrange passages for the first compressor 24b and the second compressor 42 in parallel, so that the structure of the engine 10 is not complicated. Therefore, the structure of the engine 10 is simplified.

Since the electric supercharger 24 is employed as a supercharger having a low capacity, the secondary air is stably supplied into the discharge passage 31 irrespective of the number of revolutions of the engine body 11 even when the automobile is started and the number of revolutions of the engine body 11 is low. Similarly, each combustion chamber 12 is stably supercharged.

When secondary air is supercharged into the discharge passage 31, the turbocharger bypass valve 29b is opened. With this, air compressed by the electric supercharger 24 passes mainly through the turbocharger bypass passage 29a, and the air is restrained from entering the second compressor 42 and the intercooler 25.

With this, intake pressure loss caused when the air passes through the second compressor 42 and the intercooler 25 is suppressed. That is, when the secondary air is supplied, the air is efficiently supplied into the discharge passage 31 and is efficiently supercharged into each combustion chamber 12.

When the revolution number of the engine body 11 is in the range of low to middle levels and the load is at the middle level, since the turbocharger bypass valve 29b is opened, the air compressed by the electric supercharger 24 is restrained from entering the second compressor 42 and the intercooler 25.

With this, since the intake resistance is reduced, the air compressed by the electric supercharger 24 is supercharged into each combustion chamber 12 with excellent response with respect to the depression of the acceleration pedal. Thus, the automobile is accelerated with excellent response with respect to the depression of the acceleration pedal.

When the electric supercharger 24 is not operated, since the electric supercharger bypass valve 28b is opened, the air is restrained from entering the first compressor 24b. With this, since the intake pressure loss caused when the air passes through the first compressor 24b is suppressed, air is efficiently supplied to each combustion chamber 12.

Figure 2:
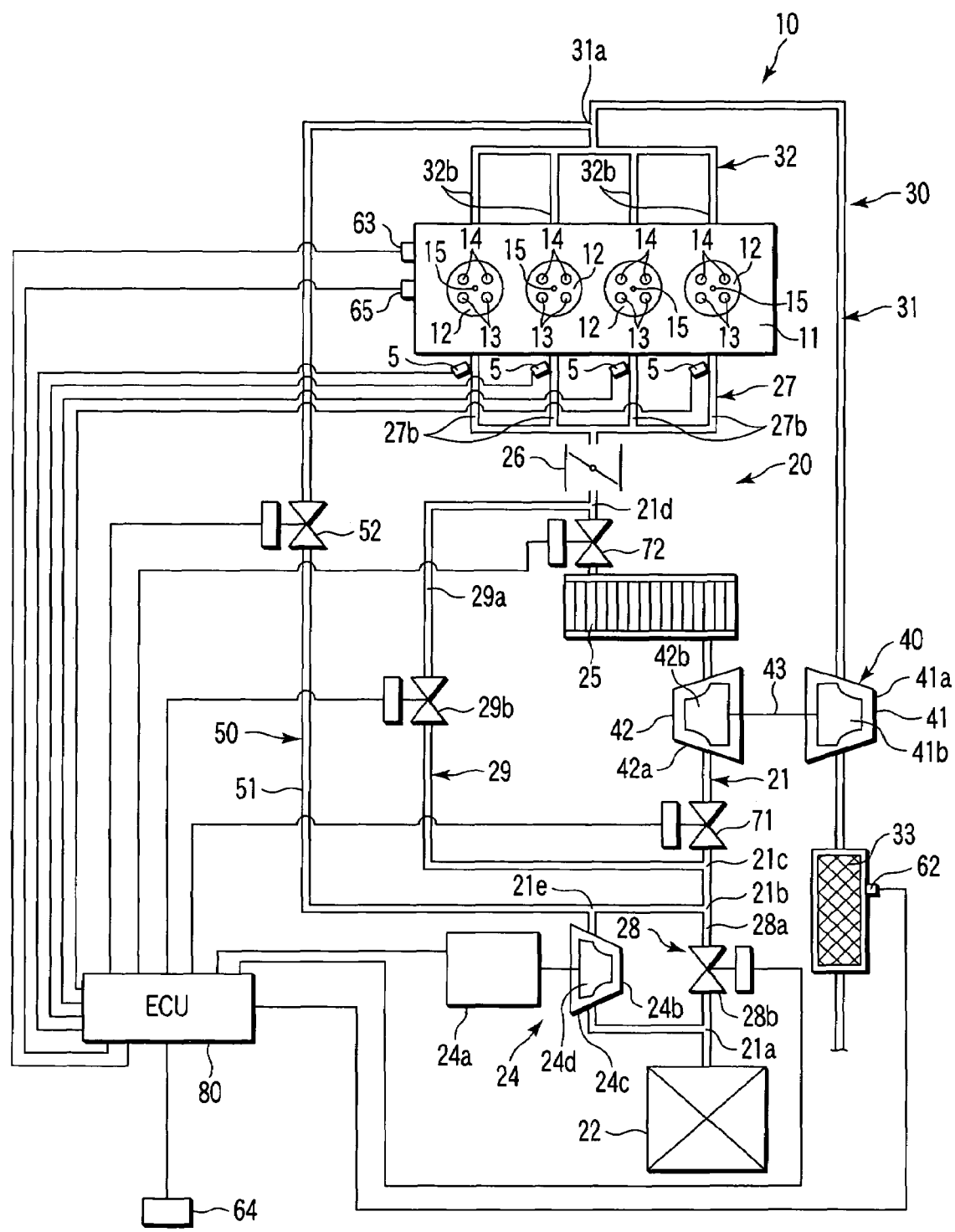
FIG. 2 is a schematic diagram of an engine according to a second embodiment of the present invention.

Next, an internal combustion engine having a supercharger according to a second embodiment of the invention will be explained with reference to FIG. 2 based on the engine 10 like the first embodiment. Structures having the same effects as those of the first embodiment are designated with the same symbols, and explanation thereof will be omitted.

In the second embodiment, an engine 10 further includes an entering-preventing valve 71 and a backflow preventing valve 72. This is different from the first embodiment. Other structures may be the same as those of the first embodiment.

The different point will be explained. FIG. 2 is a schematic diagram of the engine 10. As shown in FIG. 2, the entering-preventing valve 71 is provided between a first branch portion 21c and a second compressor 42 in an intake passage 21. The entering-preventing valve 71 is a solenoid valve for example. The entering-preventing valve 71 opens and closes the intake passage 21. The entering-preventing valve 71 is electrically connected to an ECU 80.

The backflow preventing valve 72 is provided between a first merging portion 21d and an intercooler 25 in the intake passage 21. The backflow preventing valve 72 is a solenoid valve for example. The backflow preventing valve 72 opens and closes the intake passage 21. The backflow preventing valve 72 is electrically connected to the ECU 80.

Next, the operation of the engine 10 of the second embodiment will be explained.

When the engine 10 is started, if the ECU 80 detects that an engine body 11 is cold from information of a catalyst temperature sensor 62 and a cooling water temperature sensor 63, the ECU 80 closes an electric supercharger bypass valve 28b, the entering-preventing valve 71 and the backflow preventing valve 72.

The ECU 80 opens a turbocharger bypass valve 29b and a secondary air valve 52. The ECU 80 drives an electric supercharger 24 and increases the amount of fuel injected from each injector 5.

With this, an electric supercharger bypass passage 28a is cut off. The entering-preventing valve 71 prevents the air compressed by the electric supercharger 24 from entering the second compressor 42. The backflow preventing valve 72 prevents air which has passed through a first merging portion 21d from flowing reversely into the intercooler 25. Thus, the intake capacity is reduced. The entering-preventing valve 71 and the backflow preventing valve 72 constitute one example of the restraining means of the present invention.

With this, a portion of air compressed by a first compressor 24b passes through a turbocharger bypass passage 29a and is supercharged efficiently into each combustion chamber 12.

Fuel supplied to each combustion chamber 12 is increased by the control of the ECU 80. Thus, the amount of unburned fuel included in the exhaust gas is increased. A portion of the air compressed by the first supercharger 24b passes through a secondary air supply passage 51 and is supplied to a discharge passage 31.

With this, unburned fuel is burned in the discharge passage 31 by the supplied compressed air. This combustion heats the discharge passage 31 at an early stage. That is, a catalyst 33 is heated to the active temperature at an early stage. Since the catalyst 33 is heated to the active temperature, harmful material such as unburned fuel and NOx in the exhaust gas is purified by the catalyst 33.

If the catalyst 33 is heated to the active temperature, it becomes unnecessary to supply the secondary air to the discharge passage 31 through the electric supercharger 24. Thus, if the catalyst temperature sensor 62 detects that the catalyst 33 is heated to the active temperature, the ECU 80 closes the secondary air valve 52, and stops the electric supercharger 24. With this, the supply of the compressed air into the discharge passage 31 is stopped.

The ECU 80 opens the electric supercharger bypass valve 28*b*, the turbocharger bypass valve 29*b*, the entering-preventing valve 71 and the backflow preventing valve 72. With this, air which has passed through an air cleaner 22 passes through the electric supercharger bypass passage 28*a* and the turbocharger bypass valve 29*b*.

On the other hand, air which has passed through the air cleaner 22 is restrained from entering the first and second compressors 24*b* and 42. This is because the second compressor 42 and the stopped first compressor 24*b* act as resistance to air flow. In this state, the air is restrained from entering the first and second compressors 24*b* and 42 and the intercooler 25. Thus, the intake pressure loss is suppressed.

The entering-preventing valve 71 and the backflow preventing valve 72 are opened to prevent the rotation of a turbine wheel 41*b* from being attenuated. More specifically, the turbine wheel 41*b* receives energy of the exhaust gas and rotates even when the number of revolutions of the engine 10 is low. A second compressor wheel 42*b* in the second compressor 42 also rotates in association with the turbine wheel 41*b*. With this, air in the second compressor 42 is discharged toward downstream of the second compressor 42.

At that time, if the entering-preventing valve 71 is closed, air is not supplied into the second compressor 42, and negative pressure is generated in the second compressor. This negative pressure attenuates the rotation of the second compressor wheel 42*b*. Thus, the rotation of the turbine wheel 41*b* is also attenuated in association with the second compressor wheel 42*b*. Thus, the entering-preventing valve 71 and the backflow preventing valve 72 are opened.

Next, the driver starts the automobile after preparation for the start. In this state, the number of revolutions of the engine 10 is low. The driver depresses the acceleration pedal and accelerates the automobile.

When accelerating the automobile from low or middle speed to a predetermined speed for a short time, that is, if the ECU 80 detects that the number of revolutions of the engine 10 is changed from low to middle and the load becomes at the middle level from the information of a number of revolution sensor 65 and an acceleration pedal opening sensor 64, the ECU 80 opens the turbocharger bypass valve 29*b*, and closes the electric supercharger bypass valve 28*b*, the entering-preventing valve 71, the backflow preventing valve 72 and the secondary air valve 52, and drives the electric supercharger 24. With this, the electric supercharger bypass passage 28*a* and the secondary air supply passage 51 are cut off.

With this, air which has passed through the air cleaner 22 does not pass through the electric supercharger bypass passage 28*a* and reaches the first compressor 24*b*. The air inhaled into the first compressor 24*b* passes through the turbocharger bypass passage 29*a* by the electric supercharger 24 and is supercharged into each combustion chamber 12.

At that time, since the air bypasses the second compressor 42 and the intercooler 25, the intake capacity is reduced. Thus, the compressed air is efficiently supercharged into each combustion chamber 12. That is, the automobile is accelerated with excellent response with respect to the depression of the acceleration pedal.

If the ECU 80 detects that the automobile goes uphill or that the number of revolutions of the engine body 11 is in the range of low to middle levels and the load is high from the information of the acceleration pedal opening sensor 64 and the number of revolution sensor 65, the ECU 80 closes the electric supercharger bypass valve 28*b*, the turbocharger bypass valve 29*b* and the secondary air valve 52, opens the entering-preventing valve 71 and the backflow preventing valve 72 and drives the electric supercharger 24.

With this, the electric supercharger bypass passage 28*a*, the turbocharger bypass passage 29*a* and the secondary air supply passage 51 are cut off. Thus, air which has passed through the air cleaner 22 is compressed in two stages by the electric supercharger 24 and the turbocharger 40, and is supercharged into each combustion chamber 12. Thus, the engine 10 can obtain high output.

When the ECU 80 detects that the number of revolutions of the engine body 11 is high and the load is high, for example, the automobile runs on a expressway from the information of the acceleration pedal opening sensor 65, the ECU 80 opens the electric supercharger bypass valve 28*b*, the entering-preventing valve 71 and the backflow preventing valve 72, closes the turbocharger bypass valve 29*b* and the secondary air valve 52, and stops the electric supercharger 24.

This is because the electric supercharger 24 is set such that it is effectively operated when the number of revolutions of the engine 10 is in the range of low to middle levels, and the electric supercharger 24 acts as resistance to the air flow when the number of revolutions of the engine 10 is high.

With this, the air which has passed through the air cleaner 22 bypasses the first compressor 24*b* and reaches the second compressor 42. Then, the air which has passed the air cleaner 22 is supercharged into each combustion chamber 12 by the turbocharger 40. Thus, the engine can obtain higher output even when the number of revolutions of the engine is high and the load is high.

The engine 10 of the second embodiment further includes the entering-preventing valve 71. When the engine 10 starts at the cold temperature or the secondary air is supplied into the discharge passage 31, the entering-preventing valve 71 is closed to prevent the compressed air from entering the second compressor 42.

With this, since the intake capacity of the intake system 20 is reduced, air is efficiently supercharged into each combustion chamber 12, and the compressed air is efficiently supplied to the discharge passage 31.

For this reason, in addition to the effects of the first embodiment, the catalyst 33 can be heated to the active temperature more swiftly. Therefore, harmful material such as unburned fuel in the exhaust gas is further restrained from being discharged outside.

At the time of acceleration of the automobile at the middle or low speed, or when the engine body 11 is rotating at low or middle speed and the load is at the middle level, if the entering-preventing valve 71 is closed, the compressed air is prevented from entering the second compressor 42. Thus, the intake capacity is reduced.

Therefore, since the compressed air is efficiently supercharged into each combustion chamber 12, the automobile is accelerated with more excellent response with respect to the depression of the acceleration pedal, in addition to the effects of the first embodiment.

The engine 10 of the second embodiment includes the entering-preventing valve 71 and the backflow preventing valve 72. When the engine 10 is started at the cold temperature or secondary air is supplied into the discharge passage 31, the entering-preventing valve 71 and the backflow preventing valve 72 are closed to prevent the compressed air from reversely flowing toward the second compressor 42.

With this, since the intake capacity of the intake system 20 is reduced, the air is efficiently supercharged into each combustion chamber 12, and the compressed air is efficiently supplied to the discharge passage 31.

Thus, in addition to the effects of the first embodiment, the catalyst 33 can be heated to the active temperature more swiftly, and harmful material such as unburned fuel in the exhaust gas is further restrained from being discharged outside.

At the time of acceleration of the automobile at middle or low speed, or when the engine body 11 is rotating at low or middle speed and the load is at the middle level, since the entering-preventing valve 71 and the backflow preventing valve 72 are closed, compressed air is prevented from reversely flowing toward the second compressor 42. Thus, the intake capacity is reduced.

Therefore, since the compressed air is efficiently supercharged into each combustion chamber 12, in addition to the effects of the first embodiment, the automobile is accelerated with more excellent response with respect to the depression of the acceleration pedal.

Since the entering-preventing valve 71 and the backflow preventing valve 72 are provided, in a state in which the entering-preventing valve 71 and the backflow preventing valve 72 are closed, air is prevented from entering the second compressor 42 and the intercooler 25 and thus, the intake capacity is reduced.

In the first and second embodiments, the driving state detection means includes the catalyst temperature sensor 62, the cooling water temperature sensor 63, the acceleration pedal opening sensor 64 and the number of revolution sensor 65, but the invention is not limited to this structure.

In short, it is only necessary that the driving state detection means can detect the driving state of the engine 10. Even during a period except for the start-up of the engine 10, if the catalyst 33 is not heated to the active temperature, the secondary air valve 52 may be opened to supply the compressed air into the discharge passage 31.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An intake system of an internal combustion engine, comprising:
    a first supercharger provided in an intake passage which is in communication with a combustion chamber and supercharges intake air into the combustion chamber;
    a second supercharger provided in the intake passage in series with respect to the first supercharger and supercharges the intake air into the combustion chamber;
    secondary air supply means for supplying secondary air compressed by the first supercharger to a discharge passage which is in communication with the combustion chamber; and
    a catalyst which is provided in the discharge passage and purifies exhaust gas; and
    restraining means for selectively restraining air compressed by the first supercharger from entering the second supercharger.

2. An intake system of an internal combustion engine, comprising:
    an internal combustion engine body having a combustion chamber;
    an intake passage which is in communication with the combustion chamber;
    a discharge passage which is in communication with the combustion chamber;
    an electric supercharger which comprises a driving electric motor and which is provided in the intake passage and which supercharges the intake air to the combustion chamber;
    a turbocharger which is provided in the intake passage at the downstream of the electric supercharger and which is driven by exhaust gas;
    a secondary air supply passage which is branched off from a secondary air supply passage branch portion between the electric supercharger and the turbocharger in the intake passage, and which merges with the discharge passage;
    a secondary air valve which is provided in the secondary air supply passage and opens and closes the secondary air supply passage;
    a turbocharger bypass passage which is branched off from a first branch portion between the electric supercharger and the turbocharger in the intake passage, and which merges with a first merging portion between the turbocharger and the engine in the intake passage;
    a turbocharger bypass valve which is provided in the turbocharger bypass passage and opens and closes the turbocharger bypass passage by the controller,
    a catalyst which is provided in the discharge passage and purifies exhaust gas; and
    a controller which controls an opening and closing operation of the secondary air valve and a driving operation of the electric supercharger based on a driving state of the internal combustion engine body, and which opens the secondary air valve and drives the electric supercharger when secondary air is supplied to the discharge passage.

3. The intake system according to claim 2, wherein the controller opens the turbocharger bypass valve when secondary air is supplied to the discharge passage.

4. The intake system according to claim 3, further comprising:
    an entering-preventing valve which is provided at the downstream of the secondary air supply passage branch portion and the first branch portion in the intake passage and at the upstream of the turbocharger, and which opens and closes the intake passage by the controller,
    and in which
    the controller closes the entering-preventing valve when secondary air is supplied to the discharge passage or when the number of revolutions of the internal combustion engine body is low and a load thereof is at a middle level.

5. The intake system according to claim 3, further comprising:
    a backflow preventing valve which is provided between the first merging portion and the turbocharger in the intake passage and opens and closes the intake passage by the controller,
    and in which
    the controller closes the backflow preventing valve when secondary air is supplied to the discharge passage or when the number of revolutions of the internal combustion engine body is low and a load thereof is at a middle level.

6. The intake system according to claim 2, further comprising:
    an electric supercharger bypass passage which is branched off from a second branch portion upstream of the electric supercharger and merges with a second merging portion between the electric supercharger and the turbocharger in the intake passage; and an electric supercharger bypass valve which is provided in the electric supercharger bypass passage and opens and closes the electric supercharger bypass passage by the controller,
and in which
the controller opens the electric supercharger bypass valve when the electric supercharger is not operated.

* * * * *